United States Patent Office 3,420,790
Patented Jan. 7, 1969

3,420,790
POLYETHYLENE-NATURAL WAX EMULSIONS FOR THE COATING OF FRUITS AND VEGETABLES
Saul Alexander Gàssner, Rehovoth, Israel, Esther Hellinger, London, England, and Aharon Katchalsky, Tel Aviv, and David Vofsi, Rehovoth, Israel, assignors to Yeda Research and Development Co., Ltd., Rehovoth, Israel, a company of Israel
No Drawing. Continuation-in-part of application Ser. No. 202,710, June 15, 1962. This application Dec. 22, 1965, Ser. No. 515,763
Claims priority, application Israel, Feb. 20, 1962, 16,838
U.S. Cl. 260—23
Int. Cl. A23b 7/16; C08f 29/04; C08f 45/64
10 Claims

ABSTRACT OF THE DISCLOSURE

Emulsions containing polyethylene and a natural wax are used to form protective coatings on fruits and vegetables.

---

This application is a continuation-in-part of copending application Ser. No. 202,710 filed on June 15, 1962, now abandoned.

In the following specification, all parts and percentages are given by weight, unless otherwise indicated.

The present invention relates to a novel composition for forming a protective coating on fruit and vegetables, and to a method of preservation of such produce employing the novel composition. More particularly, the invention relates to an aqueous emulsion suitable for forming a non-toxic protective coating on citrus fruits, tomatoes, avocado, bananas, or like fruit and vegetables.

Fruit and vegetables tend to deteriorate and to lose weight during prolonged periods of storage and/or transport. Moreover, the incidence of fungal rot during such periods may be quite substantial. Consequently, the appearance of fruit and vegetables subjected to such delays prior to marketing is markedly impaired and the sales appeal of such produce markedly decreased, ultimately resulting in substantial economic loss.

Numerous coatings have previously been proposed for coating fruit and vegetables to minimize weight loss and deterioration during delays in marketing the same. Such coatings have made use of a wide variety of plastic compositions, waxes, fats or the like.

Unfortunately, as noted in Tisdale et al. United States Patent No. 2,213,557 (column 1, line 43 et seq.), the suitability of a particular coating composition for the special function of preserving fruit and vegetables cannot be predicted from the general suitability of such a composition as a coating. This is the case because of the peculiar requirements for protective coatings for fruit and vegetables, viz., the manifest difficulty of obtaining wetting and adhesion of the coating to the produce, and cohesion of the coating itself. Another major difficulty is encountered in obtaining produce coatings which prevent excessive loss of weight of the coated produce during marketing delays and yet which do not impair "breathing" thereof.

As a consequence of the preceding considerations, most heretofore proposed protective coatings for fruit and vegetables have proved unsatisfactory. The principal deficiency of such coating compositions has been their inability to preserve the articles coated against deterioration. This has been the case since most such compositions impair the "breathing" of the coated produce, resulting in a rapid deterioration thereof which, in many cases, is equivalent to that experienced in the absence of the protective coating. Moreover, with some prior protective coatings surface "breathing" is so decreased that the fruit or vegetables coated rapidly become unfit for human consumption.

It is accordingly among the objects of the present invention to provide a composition useful as a protective coating for fruit and vegetables to preserve such produce during prolonged periods of storage and transportation.

A further object of the invention is to provide such a composition which, when utilized in a protective coating for produce, effects a substantial decrease in weight loss and fungicidal deterioration as compared with previously known protective coatings for fruit and vegetables.

Yet an additional object of the invention is to provide a method for the preservation of fruit and vegetables, particularly citrus fruit, tomatoes, avocados, bananas, and the like, involving coating such produce with thin layers of the novel composition hereof.

The nature and objects of the invention will be more apparent from a consideration of the following detailed description thereof.

It has been discovered, in accordance with the present invention, that surprisingly superior protective coatings for fruit and vegetables may be produced, employing an aqueous emulsion of an emulsifiable polyethylene resin—that is to say a resin having carboxy groups inserted into the polymeric chain, having a molecular weight within the range of from about 2,500 to 10,000, in admixture with a relatively high melting point natural wax, in the proportion of from about ⅓ to 3 parts by weight of the wax per part of the polyethylene resin. The polyethylene/wax constituents are dispersed with an emulsifying agent and a stabilizing agent, preferably morpholine or piperidine, each of which agents is incorporated in the aqueous emulsion in an amount of from about 0.1% to 10% by weight thereof, the overall emulsion having a solids concentration of from about 3% to 20% for coating, or up to as much as 37% by weight for shipment in concentrate form.

It has been found that preservative coatings prepared with such an emulsion are sufficiently impervious to prevent excessive desiccation during storage or shipments prior to marketing, yet do not so impair the "breathing" of the produce as to increase the rate of deterioration thereof. In fact, it has been noted that the polyethylene resin-natural wax-emulsifying agent-stabilizing agent composition in the designated proportions exhibits a synergistic preservative effect markedly unlike the effects produced by the use of any of the several coating ingredients, either singly or in differing proportions.

Moreover, the coatings thus produced are water-repellant and enhance the appearance of the coated produce. In the case of citrus fruit, for example, the preservative coating imparts a desirable luster or gloss to the fruit and permits storage, shipment and display thereof without necessitating any outer paper wrapper.

The polyethylene resins incorporated in the aqueous emulsions hereof consist essentially of polymers of ethylene having average molecular weights of between 2500 and 10,000. Commercially available polyethylene resins which have been found particularly suitable in the practice of the present invention are "Epolene E10" and "Epolene E13." Each of these products has a molecular weight of 2500, an acid number of between 12 and 17, and a viscosity at 125° C. in the range of 900 to 1500 cps., a softening point about 105° C., forms exceptionally stable emulsions containing substantially very little low molecular weight residues, and leaves no ash.

The polyethylene is incorporated in the aqueous emulsion in an amount of from about 2 to 10 weight percent, preferably from about 3 to 6 weight percent. Admixed therewith in an amount of from about 1 to 3, preferably from about ⅔ to ⅗, parts per part of the resin, is a relatively high melting point natural wax. Waxes which have been so utilized include carnauba wax, Japan wax, beeswax, candallila wax or sugar cane wax, employed singly or in admixture.

The polyethylene and natural wax ingredients are emulsified in water with the aid of a suitable saponifiable emulsifying agent incorporated in an amount of from about 0.1% to 10%, preferably from 0.3% to 3%, by weight of the overall emulsion. Any of the long chain aliphatic acid emulsifiers may be thus utilized, it being preferred to employ either compounds having the formula $C_nH_{2n+1}COOH$, wherein $n$ is an integer from 8 to 28, or compounds having the formula $$CH_3(CH_2)_mCH\!=\!CH(CH_2)_{m'}COOH$$

wherein $m$ and $m'$ are each integers from 5 to 10. Particularly suitable emulsifying agents include palmitic acid, stearic acid, oleic acid, ricinoleic acid, linoleic acid, linolenic acid and other suitable fatty acids obtained by saponification of natural fats.

The stabilizing agent incorporated in the aqueous emulsions hereof is similarly utilized in an amount of from about 0.1% to 10%, preferably from about 0.3% to 3%, by weight of the emulsion. Desirably, morpholine and/or piperidine comprise the stabilizing agent.

The polyethylene, wax, emulsifying agent, and stabilizing agent ingredients are emulsified in conventional manner in an aqueous outer phase, the resulting emulsion containing from about 3% up to as much as 37% solids. Emulsions having solids concentrations of from about 3% to 20%, preferably from about 14% to 17%, may be utilized directly for the coating of fruit or vegetables, it being intended that higher solids concentrations up to as much as 37% by weight, may be compounded for transportation economies and thereafter diluted for use.

If desired, increased gloss may be imparted to produce coated with the composition hereof by incorporating shellac in the aqueous emulsion, desirably in an amount of from about 1% to 10% by weight thereof. Conveniently, the shellac may be added in the form of a solution of shellac in aqueous ammonia.

Additionally, if desired, a fungistatic agent may be added to the emulsion in an amount of from about 0.1% to 1.0% by weight to inhibit the development of fungi. A fungistatic agent which may be thus employed is sodium orthophenylphenate.

The aqueous emulsions of the invention can be applied to the fruit or vegetables to be coated in any desired manner, as, for example, by spraying, dipping, brushing, foaming, or like operations. The composition can be stored, coated and cured under ambient atmospheric conditions.

The following examples illustrate preferred forms of the method and composition of the present invention, without being intended to be limiting thereof.

Example I 10 grams of a polyethylene resin (Epolene E10), having a molecular weight of 2500, 10 grams carnauba wax and 4 grams oleic acid were melted together in an oil bath at a temperature of 110° C. 2.5 grams morpholine and 0.25 gram potassium hydroxide dissolved in 20 ml. water were then added and the mixture heated for two minutes. 140 ml. water was added to the mixture without stirring.

7.2 grams of shellac was heated in a solution containing 1.8 ml. ammonium hydroxide in 51 ml. water. The resulting solution was then added to the polyethylene, wax-containing mixture, a stable emulsion resulting which did not break down even after prolonged storage.

Oranges were coated with the aqueous emulsion thus prepared by spraying the emulsion thereon. The coated fruit were stored at room temperature for four weeks, after which they were weighed. The weight loss was only 3.2% at the end of this period and no deterioration was noted in the quality of the fruit.

Example II

An aqueous emulsion was prepared in the manner described in Example I, with 8 grams of candallila wax substituted for the carnauba wax. Shellac was not added to the emulsion.

30 tomatoes were coated with the resulting emulsion by brushing. The tomatoes were maintained at room temperature, as was a control batch of 30 uncoated tomatoes. After 20 days the coated tomatoes had lost an average of 5.6% of their initial weight, whereas the uncoated tomatoes had lost 9.3%. During the 20-day period, one coated tomato was spoiled by fungal rot, whereas 6 of the uncoated tomatoes were thus spoiled. Upon subsequent inspection, it was noted that the coated tomatoes were appreciably firmer than the uncoated tomatoes. Moreover, the flavor of the coated tomatoes was not impaired after the 20-day period.

Example III

Avocados were coated with a portion of the emulsion prepared as described in Example I, the emulsion not containing shellac. A sample batch of the coated fruit was maintained, together with a control batch of uncoated avocados, at room temperature, for a 10-day period. At the end of the period, the coated fruit had not deteriorated, whereas the uncoated fruit were completely spoiled.

Example IV 20 grams of a polyethylene resin (Epolene E13), having a molecular weight of 2500 and a softening point around 105° C., 20 grams of candallila wax and 8 grams of oleic acid were melted together in an oil bath at a temperature of 110° C. 5 grams morpholine and 0.5 gram potassium hydroxide in 40 ml. water were then added and the mixture heated for two (2) minutes. 280 ml. water was added to the mixture without stirring.

Oranges were coated with the aqueous emulsion thus prepared by spraying the emulsion thereon. The coated fruit were stored at room temperature for four weeks after which they were weighed. The weight loss was only 4.8% at the end of this period and no deterioration was noted in the quality of any of the fruit thus treated. The gloss on the fruit thus treated was excellent.

Example V

An aqueous emulsion was prepared in the manner described in Example IV, with 20 grams of beeswax substituted for the candelilla wax. The fruit coated with this emulsion lost only 5.4% of its weight after storage for four weeks. None of the fruit thus treated were spoiled after extended storage and a glossy appearance was retained.

Example VI

An aqueous emulsion was prepared in the manner described in Example IV with 20 grams of beeswax substituted for the candelilla wax. Oranges treated with this emulsion showed only a 5.4% weight loss after four weeks storage at room temperature. None of the oranges treated spoiled during storage and an attractive glossy appearance was retained.

Example VII

An aqueous emulsion was prepared in the manner described in Example I with 20 grams of Epolene E13 substituted for the Epolene E10. Fruit coated with this material retained a very glossy appearance even after four weeks storage. None of the fruit so treated spoiled after four weeks storage and an 8.3% weight loss was recorded.

A series of comparative tests was conducted to show the improved results attained when fruit is preserved with the composition of this invention, as compared with various control formulations.

The critical factors measured were loss of weight and spoilage during storage, as well as the appearance of the fruit, which was determined by a gloss factor. Loss of weight was measured in terms of the weight percentage loss, spoilage in terms of the percentage of fruit spoiled and gloss in terms of an arbitrary scale on which "0" was the dullest appearance and "5" the glossiest.

The following specimens were compared:

(i) oranges treated as in Examples IV through VII of the present application;
(ii) a number of washed oranges ("Control A");
(iii) a number of unwashed oranges ("Control B");
(iv) a number of oranges ("Control C") treated with a mixture of: low molecular polyethylene (a product available as AC 629, having a molecular weight of 2000), 5.36% carnauba wax, 2.14% oleic acid, 1.34% morpholine, 0.13% potassium hydroxide, and 85.68% water;
(v) a number of oranges ("Control D") treated with a mixture comprising 50% ordinary paraffin oil and 50% paraffin wax;
(vi) a number of oranges ("Control E") treated with a mixture comprising 24.51% paraffin oil, 73.53% paraffin wax and 1.96% low molecular weight polyethylene (AC 629 Polyethylene).

The results of that test are tabulated as follows:

| Test specimens | Percent loss of weight | Percent specimens spoiled | Gloss (arbitrary scale 0–5) |
|---|---|---|---|
| Example: | | | |
| IV | 4.8 | 0 | 3.5 |
| V | 5.9 | 20 | 3 |
| VI | 5.4 | 0 | 3 |
| VII | 8.3 | 0 | 4.8 |
| Control: | | | |
| A | 14.4 | 0 | 0 |
| B | 11.3 | 0 | 0 |
| C | 8.4 | 20 | 3 |
| D | 6.0 | 50 | 1 |
| E | 6.3 | 50 | 1 |

In accordance with the present invention, there is thus provided a method and composition for the preservation of fruit and vegetables involving the use of a coating for such produce which markedly decreases weight loss thereof during marketing delays, and yet which does not impair "breathing" of the coated fruit or vegetables or promote fungistatic deterioration thereof. Since various changes may be made in the compositions and procedures of the preferred embodiments described above without departing from the scope of the invention, it will be understood that the preceding description is illustrative only and should not be considered in a limiting sense.

The embodiments of the invention in which an exclusive privilege or property is claimed are defined as follows:

1. An aqueous emulsion for the coating of fruit and vegetables, which comprises:
    (a) an emulsifiable polyethylene resin having a molecular weight within the range of from 2,500 to 10,000 and a viscosity of between 900 and 1500 cps. at 125° C.;
    (b) a natural wax, said wax being incorporated in the emulsion in the proportion of from ⅓ to 3 parts by weight per part of said polyethylene resin;
    (c) a saponifiable emulsifying agent, in an amount of from 0.1 to 10 percent by weight of the emulsion; and
    (d) a stabilizing agent selected from the group consisting of morpholine and piperidine, in an amount of from 0.1 to 10 percent by weight of the emulsion.

2. The aqueous emulsion defined in claim 1, in which said natural wax is a material selected from the group consisting of carnauba wax, Japan wax, beeswax, candelilla wax and sugar cane wax.

3. The aqueous emulsion defined in claim 1, including an aqueous outer phase and having a solids concentration of from 3 to 37 percent by weight, in which:
    (a) said emulsifiable polyethylene resin comprises from 2 to 10 percent by weight of the emulsion;
    (b) said natural wax is selected from the group consisting of carnauba wax, Japan wax, beeswax, candallila wax and sugar cane wax; and
    (c) said emulsifying agent is a compound having a formula selected from the group consisting of $$C_nH_{2n+1}COOH$$

wherein $n$ is an integer of from 8 to 28, and $$CH_3-(CH_2)_mCH=CH-(CH_2)_{m'}-COOH$$

wherein $m$ and $m'$ are each integers of from 5 to 10.

4. The aqueous emulsion defined in claim 3, incorporating shellac in an amount of from 1 to 10 percent by weight of the emulsion.

5. The aqueous emulsion defined in claim 3, incorporating a sodium orthophenyl-phenate fungistatic agent.

6. The aqueous emulsion defined in claim 3, in which from ⅔ to ¾ parts by weight of said natural wax are incorporated in the emulsion per part of the polyethylene resin, and which said emulsifying agent and said stabilizing agent are each incorporated in the emulsion in an amount of from 0.3 to 3 percent by weight thereof.

7. The aqueous emulsion defined in claim 6, having a solids concentration of from 14 to 17 percent by weight of the emulsion and including a mixture of equal parts by weight of a polyethylene wax having a molecular weight of 2,500 and carnauba wax.

8. A method for the protective coating of fruit and vegetables, which comprises applying a thin coating of the aqueous emulsion defined in claim 1 to same.

9. A method for the protective coating of fruit and vegetables, which comprises applying a thin coating of the aqueous emulsion defined in claim 3 to same.

10. A method for the protective coating of fruit and vegetables, which comprises applying a thin coating of the aqueous emulsion defined in claim 6 to same.

References Cited

UNITED STATES PATENTS

| | | | |
|---|---|---|---|
| 2,213,557 | 9/1940 | Tisdale et al. | 260—27 |
| 2,275,659 | 3/1942 | Steinle et al. | 99—168 |
| 2,640,040 | 5/1953 | Lehman | 260—28.5 |
| 2,700,025 | 1/1955 | Cothran | 260—27 |
| 2,873,263 | 2/1959 | Lal | 260—45.75 |
| 2,964,487 | 12/1960 | Chapman et al. | 260—23 |

OTHER REFERENCES

Bennett: "The Chemical Formulary," vol. XI, 1961, pp. 263 and 264, Copy in Group 160, TP 151 B 35 C2.

DONALD E. CZAJA, *Primary Examiner.*

R. A. WHITE, *Assistant Examiner.*

U.S. Cl X.R.

260—27, 28.5, 29.6; 99—168, 222; 424—83, 346